United States Patent
Song et al.

(10) Patent No.: US 8,429,193 B2
(45) Date of Patent: Apr. 23, 2013

(54) SECURITY CONTROL OF ANALYSIS RESULTS

(75) Inventors: Yunsheng Song, Poughkeepsie, NY (US); Tso-Hui Ting, Stormville, NY (US); Brian M. Trapp, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/351,412

(22) Filed: Jan. 9, 2009

(65) Prior Publication Data

US 2010/0185675 A1    Jul. 22, 2010

(51) Int. Cl.
*G06F 17/30* (2006.01)
(52) U.S. Cl.
USPC ............................................. 707/785
(58) Field of Classification Search ............ 707/785
See application file for complete search history.

(56) References Cited

U.S. PATENT DOCUMENTS

| | | | |
|---|---|---|---|
| 6,859,805 B1 * | 2/2005 | Rogers et al. | 1/1 |
| 7,010,570 B1 | 3/2006 | Boies et al. | |
| 7,321,860 B2 | 1/2008 | Allard et al. | |
| 7,730,092 B2 * | 6/2010 | Lawson et al. | 707/783 |
| 2004/0039741 A1 | 2/2004 | Benson et al. | |
| 2004/0177075 A1 | 9/2004 | Rangadass | |
| 2005/0288939 A1 | 12/2005 | Peled et al. | |

* cited by examiner

*Primary Examiner* — Amresh Singh
(74) *Attorney, Agent, or Firm* — Cantor Colburn LLP; Ian MacKinnon

(57) ABSTRACT

A system and a method are provided. The method includes assigning an entity to a ticket group associated with an ID thereof, displaying to the entity reports, which are each organized with an associated security access control, in accordance with the ticket group, determining whether the entity is authorized to access any selected one or more of the reports in accordance with a result of a comparison between an access level associated with the entity ID and the security access control associated with each of the one or more of the stored reports, and granting or denying the access in accordance with the determination.

20 Claims, 5 Drawing Sheets

SECURITY CONTROL OF ANALYSIS RESULTS

BACKGROUND

Aspects of the present invention are directed to methods of security control and, more particularly, to methods of security control of analysis results.

In current business practices, customers and partners may be involved with one another and, therefore, security controls may be needed by each customer and partner to respectively authorize each customer and partner to have access to different analysis results. Such authorized access is generally based on relevant sections of contracts between the customers and partners. These contracts are seen in various industries, such as the semiconductor development environment industry.

Typically, security control of reports and analysis results involves a user, such as a super-user, who is responsible for creating a knowledge database or knowledge team room, from which access groups are defined, for a particular system. Thereafter, other users of the system are required to correctly pick appropriate access groups when publishing an analysis report. This process must be repeated every time these other users publish the analysis report.

A problem with this scheme exists, however, in that these users can make mistakes when selecting the groups to access the analysis report. Also, it may be difficult to set up the right access control for multiple lot analyses because the associated reports may be static. In addition, it may also be difficult for these users to search within certain lots or modules for related analyses because independent access controls may not exist across multiple knowledge databases.

BRIEF SUMMARY

In accordance with an aspect of the invention, a system to provide security control of analysis results is provided and includes a memory unit configured to store reports in a selected level of a filing system in which each stored report is associated with a security access control, a networking unit by which an entity submits an entity ID and requests access to one or more of the stored reports, a processing unit, coupled to the memory and the networking units and including an analysis security filter configured to grant the entity the requested access when an access level associated with the entity ID corresponds to the security access control associated with each of the one or more of the stored reports, and a generating unit, coupled to the processing unit and configured to provide the entity with the requested access to those of the one or more of the stored reports where the requested access is granted.

In accordance with another aspect of the invention, a computer implemented method of granting an entity access to reports is provided and includes, upon a login by the entity, assigning the entity to a ticket group associated with an ID of the entity, displaying to the entity a list of reports, which are each organized with an associated security access control within a selected level of a file system, in accordance with the ticket group to which the entity is assigned, upon a selection of one or more of the reports by the entity, determining whether the entity is authorized to access any of the one or more of the reports in accordance with a match of an access level associated with the entity ID with the security access control associated with each of the one or more of the stored reports, and granting the access in accordance with the authorization determination.

In accordance with another aspect of the invention, a method of granting access to reports is provided and includes assigning an entity to a ticket group associated with an ID thereof, displaying to the entity reports, which are each organized with an associated security access control, in accordance with the ticket group, determining whether the entity is authorized to access any selected one or more of the reports in accordance with a result of a comparison between an access level associated with the entity ID and the security access control associated with each of the one or more of the stored reports, and granting or denying the access in accordance with the determination.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
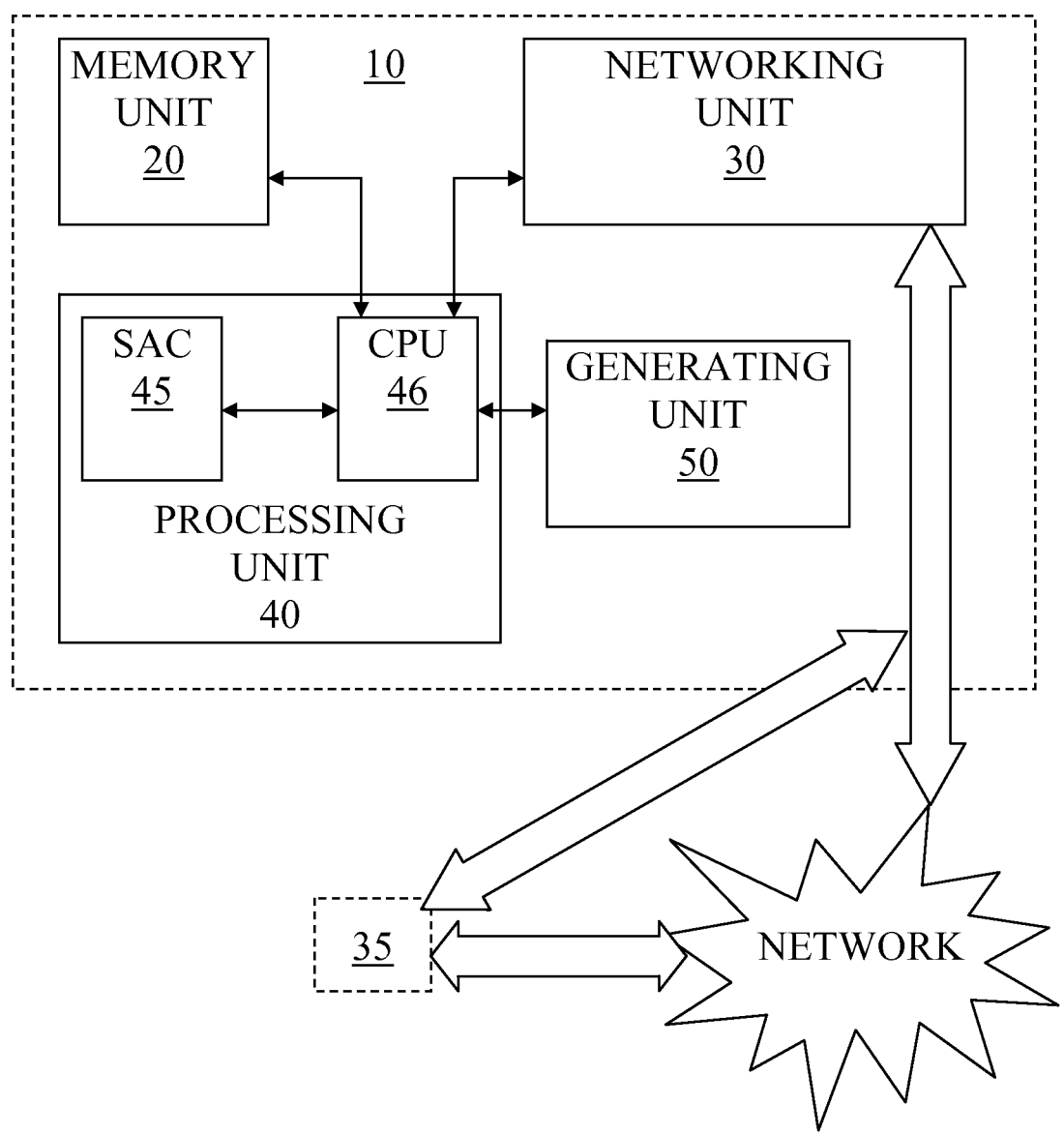
FIG. 1 is a schematic illustration of an exemplary system in accordance with an embodiment of the present invention.
Figure 2:
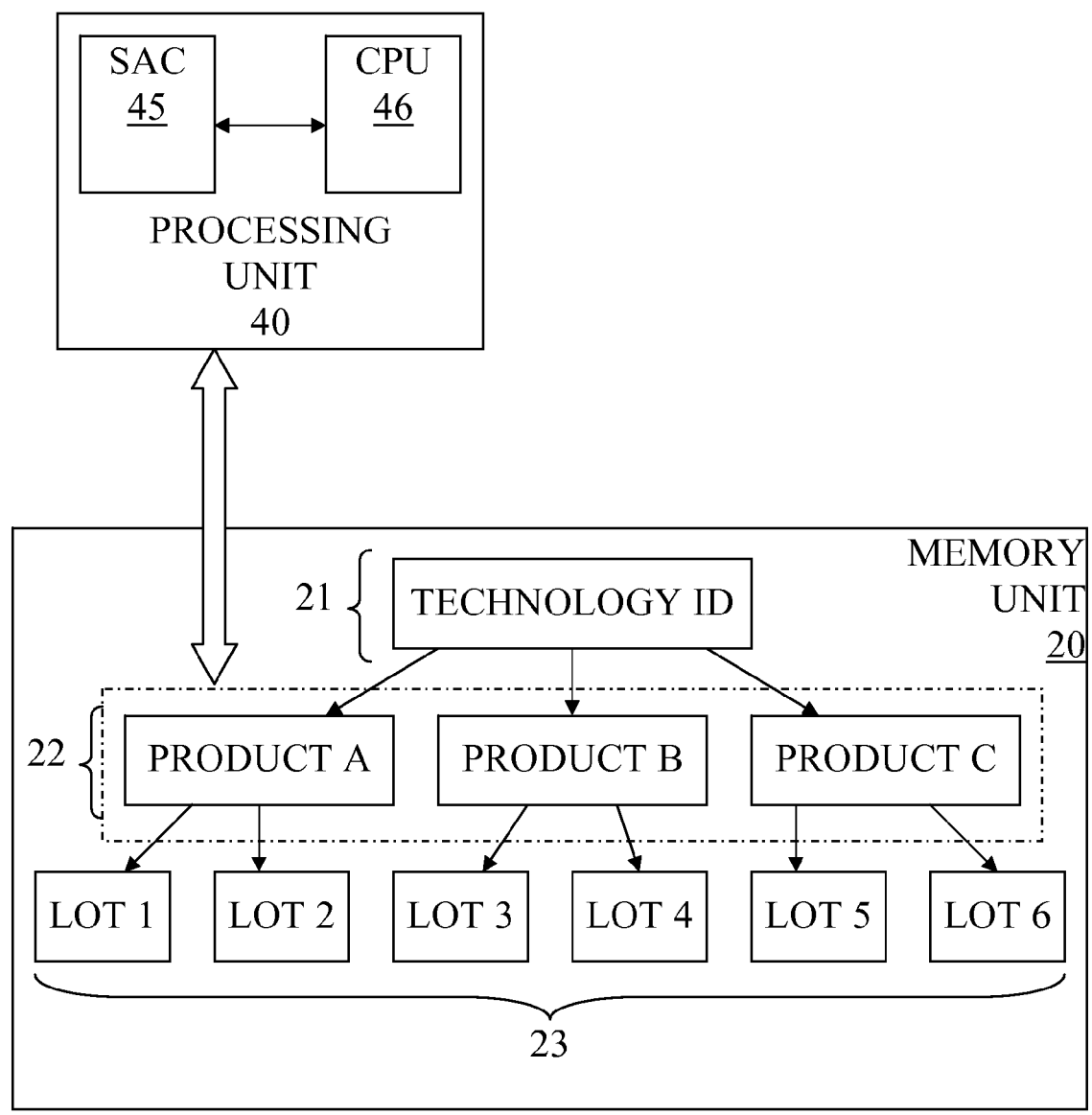
FIG. 2 is a schematic diagram of an exemplary file structure for the memory unit of FIG. 1.

With reference to FIGS. 1 and 2, a system 1 is provided. The system 1 provides security control of analysis results that may be applicable in various industries. As an example, the following description will relate to semiconductor manufacturing industries. As shown, the system 1 includes a main system 10, such as a mainframe, a central computer, or a computing hub, that includes a memory unit 20, a networking unit 30, a processing unit 40 and a generating unit 50. The memory unit 20, the networking unit 30, the processing unit 40 and the generation unit 50 may be local with respect to one another or remote.

The memory unit 20 is configured to store various types of reports related to various semiconductor-related products in a selected level of a filing system in which each stored report is associated with a security access control. The networking unit 30 is provided to allow an entity, such as a partner to a semi-conductor manufacturing agreement who may be authorized to view only a selected group of the reports, to access the system 10, submit an entity ID and request access to one or more of the stored reports. The networking unit 30 may include various types of networking hardware and/or software and may be configured to operate over a network, such as a LAN, a WAN, etc. The processing unit 40 is coupled to the memory unit 20 and the networking unit 30 and includes an analysis security filter, such as a central processing unit (CPU) 46 and a security access controller 45. The processing unit 40 is configured to grant the entity the requested access when an access level associated with the entity ID is determined to correspond to the security access control associated with each of the one or more of the stored reports. The generating unit 50 is coupled to the processing unit 40 and is configured to provide the entity with the requested access to those of the one or more of the stored reports where the requested access is granted by the processing unit 40.

The memory unit 20 may include various types of memory, such as Random Access Memory (RAM), Read-only Memory (ROM), etc., and, in accordance with embodiments of the invention, may be provided with security controls that restrict write-access thereto. That is, in these embodiments, only an authorized administrator of the system 10 is allowed to write to the memory unit 20 and thereby control the otherwise automatic and dynamic process by which reports are associated with particular security access controls. Thus, as a report is generated, either manually or automatically, the memory unit 20, as controlled or monitored by only the administrator, associates the report with the particular security access control.

As mentioned above, the reports may be manually or automatically generated. For example, where the reports are to be generated automatically and in accordance with a semi-conductor manufacturing agreement, the system 10 may be designed to automatically generate yield, defect and performance reports at selected intervals with respect to each partner and customer associated with the agreement. Other types of reports may include lot report cards, physical failure analysis, and split lot analysis.

The filing system within the memory unit 20 may include various levels within various hierarchies. In one such hierarchy, the levels may include a technology identification (ID) level 21, which identifies various types of technologies relevant to a particular agreement, a product group level 22 within the technology ID level 21, which identifies various product groups for a particular technology, and a lot level 23 within the product group level 22. The lot level 23 may include various lots, for each product group, in which, e.g., yield, defect, and performance reports are stored. Thus, for a particular technology ID within technology ID level 21, A, B and C exemplary product groups may be established within product group level 22. For each of these, lots 1 and 2, lots 3 and 4 and lots 5 and 6 may also be respectively established within lot level 23.

Within each lot, a set reports may be stored that may include, at least, defect reports, yield reports and performance reports may be stored. The security access control for any set of reports placed in a particular lot is associated with those reports at the product group level 22. Thus, as shown in FIG. 2, the security access control associated with each report within lots 1 and 2 is established with respect to product group A.

Each type of report may be displayed or provided to the user in a particular format in, e.g., a graphical user interface that is built using, e.g., Java script or some other suitable programming language. For example, a performance report may be viewed as a parametric-type chart. Conversely, a defect report may be viewed as a pareto-type chart. Of course, it is understood that these types of charts are not required and should, therefore, not be viewed as such or limiting in any way.

Within a lot the security controller can grant access to different reports to different users based on security contract. For example, user A can access both defect report and performance report, but user B can only access defect report.

The processing unit 40 may include a processor, such as the CPU 46, which is configured to operate in accordance with pre-selected algorithms by which the processing unit 40 compares the access level associated with entity ID to the security access control associated with each of the one or more of the stored reports. The processing unit 40 is configured to then grant or deny the entity the requested access when the access level associated with the entity ID respectively corresponds to or fails to correspond to the security access control associated with each of the one or more of the stored reports.

The generating unit 50 may be remote from or local to the processing unit 40 and may control a display of information to the entity in various manners. These include displaying information in a graphical user interface on a display unit local to the entity, controlling an image forming device of the entity to generate the information or electronically sending the information to the entity.

Figure 3:
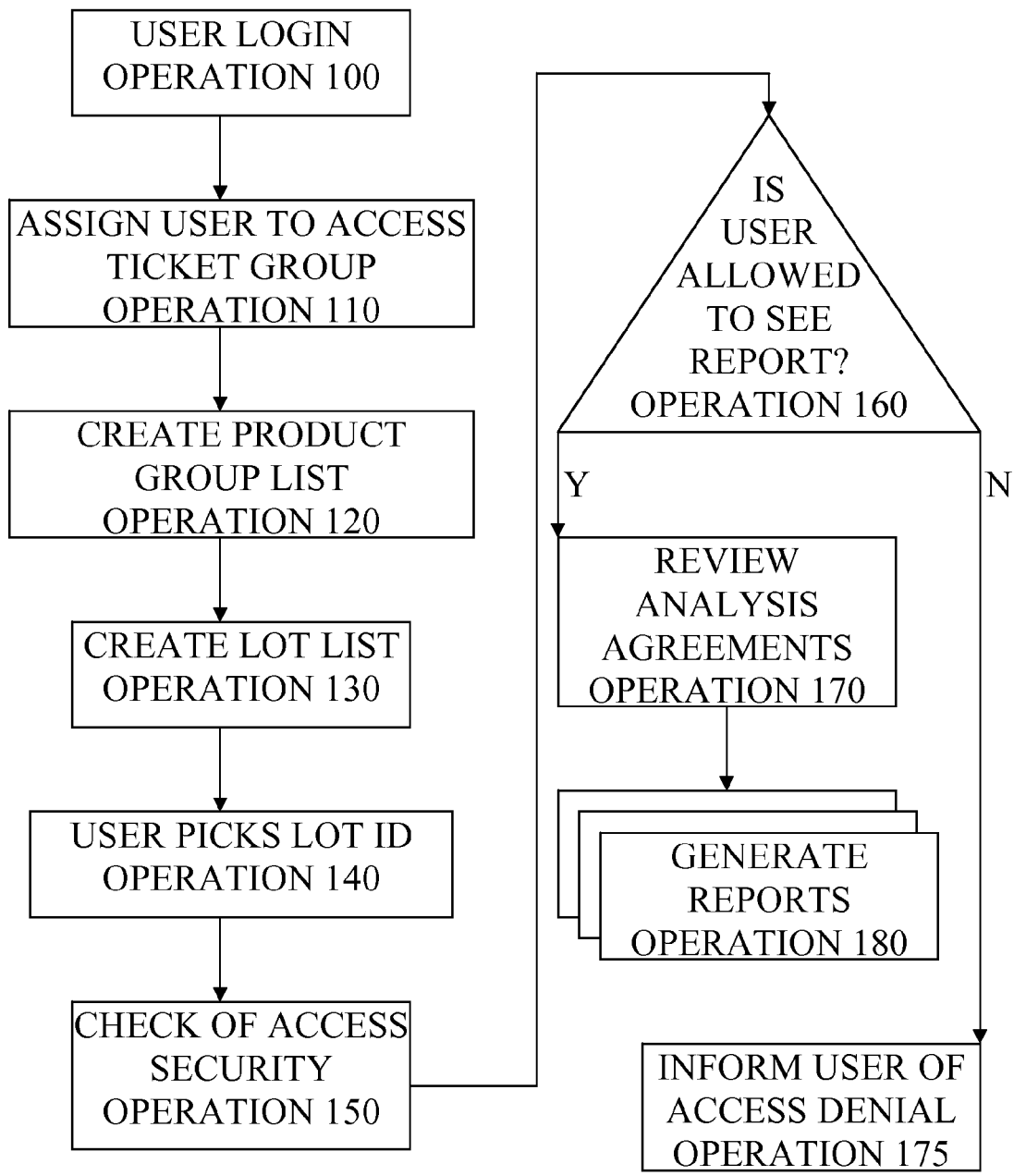
FIG. 3 is a flow diagram illustration an exemplary method in accordance with an embodiment of the present invention.
Figure 4:
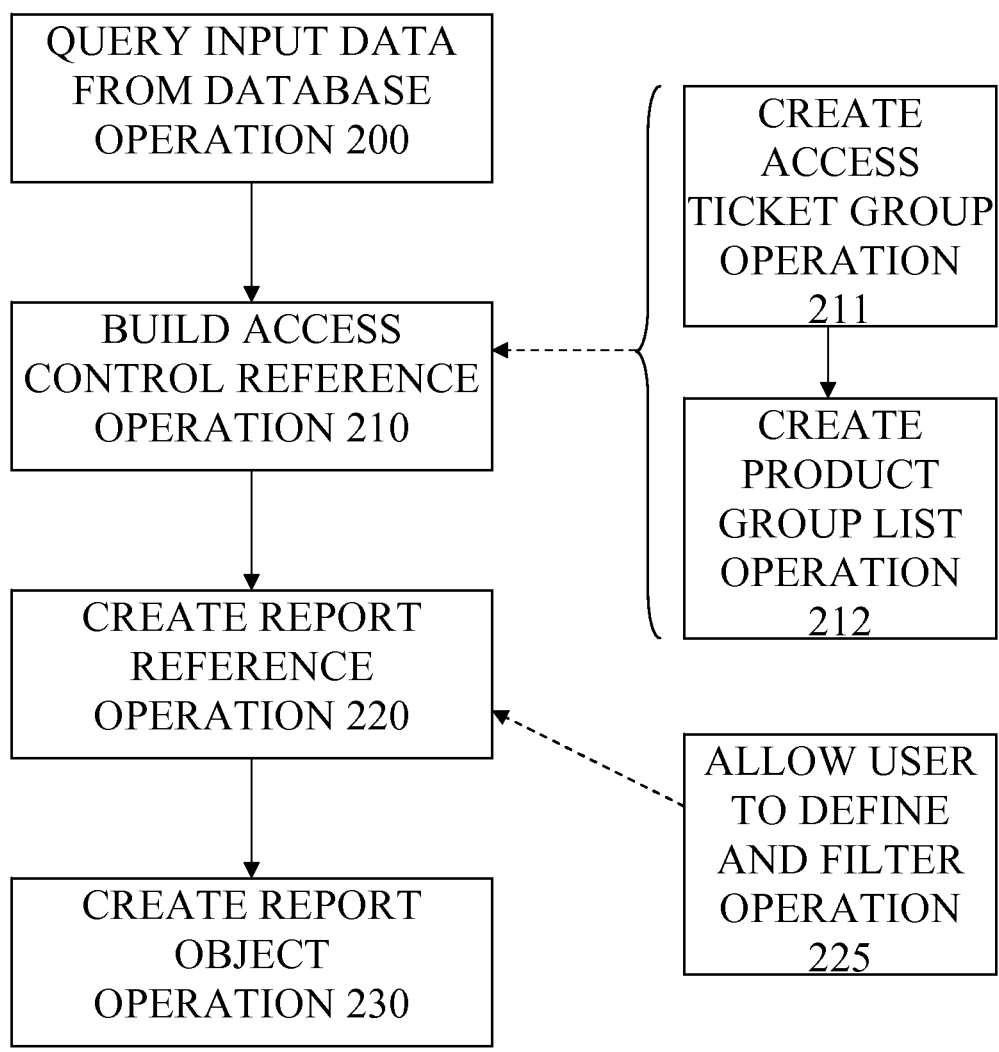
FIG. 4 is a flow diagram illustration an exemplary method in accordance with an embodiment of the present invention.
Figure 5:
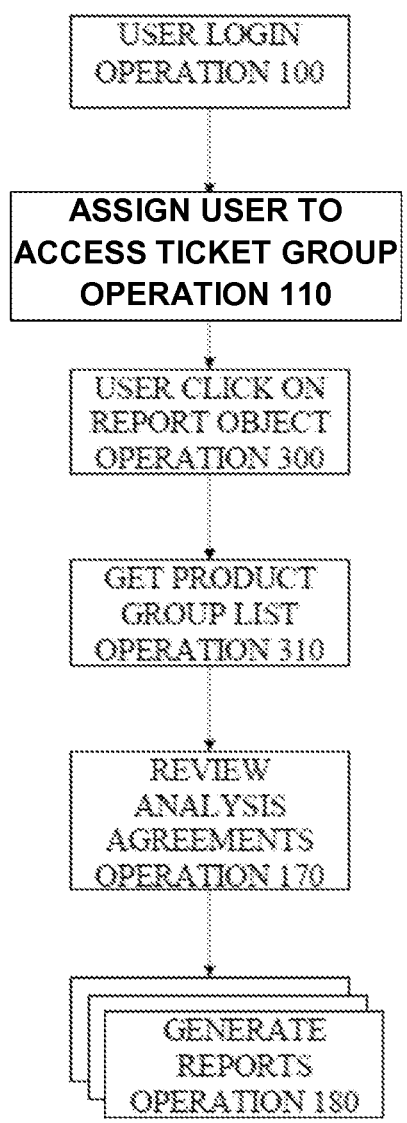
FIG. 5 is a flow diagram illustration an exemplary method in accordance with another embodiment of the present invention.

With reference to FIGS. 3-5 and, in accordance with another aspect of the invention, a computer implemented method of granting an entity access to reports is provided. The method includes, upon a login by the entity (at operation 100), assigning the entity to a ticket group associated with an ID of the entity (operation 110). At this point, the method includes displaying to the entity a list of reports, which are each organized with an associated security access control within a selected level of a file system, in accordance with the ticket group to which the entity is assigned (operations 120 and 130). Upon a selection of one or more of the reports by the entity (at operation 140), the method includes determining whether the entity is authorized to access any of the one or more of the reports in accordance with a match of an access level associated with the entity ID with the security access control associated with each of the one or more of the stored reports (operations 150 and 160), and either granting or denying the access in accordance with the authorization determination (operations 170, 175 and 180, respectively).

As shown in FIG. 3, the displaying operations may include creating a product group list from the ticket group to which the entity is assigned (operation 120). Subsequently, the method includes creating a lot list from the product group list (operation 130). In addition, as shown in FIG. 3, once the user is determined to be allowed to see a particular report, this determination is verified by a review of the relevant agreement (operation 170) before the generating of the requested report (operation 180).

With particular reference now to FIG. 4, in an instance where two or more of the reports are related to one another, the method may further include querying input data from a database (operation 200), building an access control reference table from the queried input data (operation 210) and creating a report reference and a report object from the access control reference table (operations 220 and 230, respectively). Here, the building of the access control reference table (operation 210) includes creating access ticket groups using the queries input data (operation 211), and subsequently creating product group lists for each of the created access ticket groups (operation 212). Similarly, the creating of the report reference (operation 220) includes allowing a user to define report types, to filter report agreements and to define report attributes (operation 225).

Where the user defines report types, filters reports and defines report attributes (in operation 225), the user may be provided with an opportunity to generate reports that contain trend analysis, correlation analysis and data mining analysis. Such reports allow the user to further analyze the standard yield reports, defect reports, performance reports, etc.

In accordance with the embodiments discussed above and, as shown in FIG. 5, in accordance with a further embodiment, a selection of one or more of the reports by the entity will include a selection of the report object (operation 300). Here, the method proceeds by compiling the relevant product group list associated with the selected report object (operation 310) and subsequently displaying the relevant product group list to the requesting entity. For this group list, the entity can request to view certain portions of the group list and either gain access to such portions or be denied access to the same in accordance with the algorithms discussed above.

That is, where two entities choose the same report object (in operation 300), the system 310 will restrict the information provided to those entities based on their respective entity ID. As a result, a trend chart for user A from a particular report object will look different from the same trend chart for user B if use A and B each have differently defined access rights. Moreover, in this situation, it may be that user A has access to a tool commonality report whereas user B has access to the same tool commonality report and a randomization report as well.

In accordance with another aspect of the invention, a method of granting an entity access to reports is provided and may include assigning the entity to a ticket group associated with an ID thereof (operations 100 and 110), displaying to the entity reports, which are each organized with an associated security access control, in accordance with the ticket group (operations 120 and 130), determining whether the entity is authorized to access any selected one or more of the reports in accordance with a result of a comparison between an access level associated with the entity ID and the security access control associated with each of the one or more of the stored reports (operations 140, 150 and 160), and granting or denying the access in accordance with the determination (operations 170, 175 and 180).

The methods described above may be embodied as computer readable media having executable instructions stored thereon for executing the methods.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A system to provide security control of analysis results, comprising:
    a memory unit configured to store more than one report in a selected level of a filing system in which each of the more than one stored reports in the selected level of the filing system is associated with a different security access control;
    a networking unit by which an entity submits an entity ID and requests access to one or more of the more than one stored reports by way of a selection from a list of the more than one stored reports, which is displayed to the entity, the list being displayed in accordance with a ticket group to which the entity is assigned and including a listing of reports accessible and non-accessible by the entity;
    a processing unit, coupled to the memory and the networking units and including an analysis security filter configured to grant the entity the requested access when an access level associated with the entity ID corresponds to the security access control associated with each of the one or more of the more than one stored reports; and
    a generating unit, coupled to the processing unit and configured to provide the entity with the requested access to those of the one or more of the more than one stored reports where the requested access is granted.

2. The system according to claim 1, wherein only an administrative entity is permitted to control the association of the security access control with the more than one stored reports.

3. The system according to claim 1, wherein the filing system comprises:
    a technology identification (ID) level;
    a product group level defined within the technology ID level; and
    a lot level defined within the product group, wherein the security access control is applied at, at least, the product group level.

4. The system according to claim 3, wherein the lot level comprises at least defect reports, yield reports and performance reports.

5. The system according to claim 1, wherein the processing unit comprises a processor which is configured to compare the access level associated with entity ID to the security access control associated with each of the one or more of the more than one stored reports.

6. The system according to claim 1, wherein the processing unit is configured to deny the entity the requested access when the access level associated with the entity ID fails to correspond to the security access control associated with each of the one or more of the more than one stored reports.

7. The system according to claim 1, wherein the generating unit is configured to locally display a graphical user interface to the entity.

8. The system according to claim 1, wherein the generating unit is configured to locally print information to the entity.

9. The system according to claim 1, wherein the generating unit is configured to electronically send information to the entity.

10. A computer implemented method of granting an entity access to reports, comprising:
    upon a login by the entity, assigning the entity to a ticket group associated with an ID of the entity;
    displaying to the entity a list of reports, which are each organized with an associated security access control within a selected level of a file system, in accordance with the ticket group to which the entity is assigned, the list including a listing of reports accessible and non-accessible by the entity;
    upon a selection of one or more of the reports by the entity, determining whether the entity is authorized to access any of the one or more of the reports in accordance with a match of an access level associated with the entity ID with the security access control associated with each of the one or more of the stored reports; and
    granting the access in an event the one or more of the reports selected by the entity from the list of reports has an associated security access control matching the entity ID.

11. The method according to claim 10, further comprising denying the access in an event the one or more of the reports selected by the entity from the list of reports has an associated security access control matching the entity ID.

12. The method according to claim 10, wherein the displaying comprises creating a product group list from the ticket group.

13. The method according to claim 12, wherein the displaying further comprises creating a lot list from the product group list.

14. The method according to claim 13, further comprising:
reviewing analysis agreements; and
generating the one or more of the reports to which the entity is granted access.

15. The method according to claim 10, wherein, if two or more of the reports are related, further comprising:
querying input data from a database;
building an access control reference table from the queried input data; and
creating a report reference and a report object from the control reference table.

16. The method according to claim 15, wherein the building of the access control reference table comprises:
creating access ticket groups using the input data; and
creating product group lists for each access ticket group.

17. The method according to claim 15, wherein the creating of the report reference comprises allowing a user to define report types, to filter on report agreements and to define report attributes.

18. The method according to claim 15, wherein the selection of one or more of the reports by the entity comprises a selection of the report object.

19. A non-transitory computer readable medium having executable instructions stored thereon for executing the method of claim 10.

20. A method of granting an entity access to reports, comprising:
assigning the entity to a ticket group associated with an ID thereof;
displaying to the entity a list of reports, which are each organized with an associated security access control, the displaying of the list of reports being in accordance with the ticket group and the list including a listing of reports accessible and non-accessible by the entity;
determining whether the entity is authorized to access any selected one or more of the reports in the list of reports in accordance with a result of a comparison between an access level associated with the entity ID and the security access control associated with each of the one or more of the stored reports; and
granting or denying the access in an event the one or more of the reports selected by the entity from the list of reports has an associated security access control matching or not matching the entity ID, respectively.

* * * * *